(12) United States Patent
Julliand et al.

(10) Patent No.: US 12,049,921 B2
(45) Date of Patent: Jul. 30, 2024

(54) RING FOR A DRIVE UNIT BEARING OF A MARINE VEHICLE INCLUDING A SEGMENTED ACTIVE PART

(71) Applicant: GE Energy Power Conversion Technology Limited, Warwickshire (GB)

(72) Inventors: Lionel Julliand, Belfort (FR); Bruno Fieberling, Rugby (GB); Xinmin Fan, Rugby (GB)

(73) Assignee: GE Energy Power Conversion Technology Limited, Warwickshire (GB)

( * ) Notice: Subject to any disclaimer, the term of this patent is extended or adjusted under 35 U.S.C. 154(b) by 0 days.

(21) Appl. No.: 17/342,311

(22) Filed: Jun. 8, 2021

(65) Prior Publication Data
US 2021/0293281 A1 Sep. 23, 2021

Related U.S. Application Data

(63) Continuation-in-part of application No. 16/312,657, filed as application No. PCT/EP2017/064906 on Jun. 19, 2017, now abandoned.

(30) Foreign Application Priority Data

Jun. 23, 2016 (EP) .................................... 16305761

(51) Int. Cl.
*F16C 33/04* (2006.01)
*F16C 17/10* (2006.01)
(Continued)

(52) U.S. Cl.
CPC ............ *F16C 33/046* (2013.01); *F16C 17/10* (2013.01); *F16C 17/107* (2013.01); *F16C 33/26* (2013.01); *F16C 43/02* (2013.01); *F16C 2326/30* (2013.01)

(58) Field of Classification Search
CPC ........ F16C 17/02; F16C 17/10; F16C 17/107; F16C 33/04; F16C 33/046; F16C 33/1025; F16C 33/26; F16C 43/02; F16C 2326/30

See application file for complete search history.

(56) References Cited

U.S. PATENT DOCUMENTS

| 4,141,605 A | 2/1979 | Riordan |
| 8,646,981 B2 | 2/2014 | Peterson |

(Continued)

FOREIGN PATENT DOCUMENTS

| CN | 1042222 A | 5/1990 |
| CN | 102159456 A | 8/2011 |

(Continued)

OTHER PUBLICATIONS

International Search Report and Written Opinion dated Sep. 18, 2017 which was issued in connection with PCT application No. PCT/EP2017/064906 which was filed on Jun. 19, 2017.

(Continued)

*Primary Examiner* — James Pilkington
(74) *Attorney, Agent, or Firm* — WOOD IP LLC

(57) ABSTRACT

A ring for shaft bearing of a marine vehicle drive unit has an annular body and a cylindrical active part intended to provide a sliding contact function with another ring at the bearing level. The cylindrical part is segmented into several cylindrical surfaces, each cylindrical surface being attached in a removable manner to the annular body.

11 Claims, 8 Drawing Sheets

(51) Int. Cl.
  *F16C 33/26*      (2006.01)
  *F16C 43/02*      (2006.01)

(56)           References Cited

U.S. PATENT DOCUMENTS

|   |   |   |
|---|---|---|
| 9,394,942 B2 | 7/2016 | Peterson |
| 2019/0368544 A1 | 12/2019 | Julliand |
| 2021/0348599 A1* | 11/2021 | Rohrmann ............ F16C 17/107 |

FOREIGN PATENT DOCUMENTS

| CN | 104853985 A | 8/2015 |
|---|---|---|
| DE | 102008037677 A1 | 2/2010 |
| EP | 2993365 A1 | 3/2016 |
| GB | 05619 A1 | 3/1914 |
| RU | 2138703 C1 | 9/1999 |
| WO | 0216789 A1 | 2/2002 |

OTHER PUBLICATIONS

European Search Report and Written Opinion dated Oct. 25, 2016 which was issued in connection with EP patent humber 16305761.5 which was filed on Jun. 23, 2016.

* cited by examiner

RING FOR A DRIVE UNIT BEARING OF A MARINE VEHICLE INCLUDING A SEGMENTED ACTIVE PART

FIELD OF THE DISCLOSURE

This invention concerns the field of drive units of marine vehicles, such as ships, submarines or even oil platforms. More particularly, the present invention concerns the field of platform drive units.

BACKGROUND

These drive units, also known as a "propulsion oriented drive", or "POD", generally include:
- a mobile housing, or mobile platform, mechanically connected to the marine vehicle with a pivot link around an axis such as for example the vehicle's yaw axis,
- a drive shaft extending according to the mobile housing longitudinal direction and mechanically connected with a pivot link around its own axis to the marine vehicle, and
- a drive element, such as a propeller or a pump rotor, mounted on the drive shaft.

In general, in order to achieve the pivot link mechanically connecting the drive shaft and the drive element, two shaft bearings are mounted on both ends of the drive shaft. The two shaft bearings are designed to maintain the drive shaft on its radial direction, in other words the radial guide. For example, the shaft bearings can be friction type bearings, including two rings fastened to the mobile housing and the drive shaft, respectively. One of the two rings has a cylindrical part ensuring a sliding contact function with a sliding surface provided on the other ring.

One of the two shaft bearings is also designed to ensure the drive shaft support function according to its axial direction, i.e., axial guidance. To do this, one of the concerned shaft rings has a front active part providing a sliding contact function with a sliding surface mounted on an axial stop of the drive bearing.

In order to preserve the shaft bearing life span, it's usually necessary to replace its active parts regularly.

To do so, the drive unit can be disassembled from the marine vehicle and transported in the workshop. An operator shall then have the space and tools required to open the drive bearings, disassemble the active parts and replace them with new ones. However, such a solution requires to immobilize the marine vehicle in dry docks for the time needed to replace the active parts.

In order to compensate for this drawback, arrangements can be provided within the mobile housing, so as to allow the operator to enter and work inside the drive unit of the mobile housing. In this case, it is not necessary to disassemble the drive unit and to immobilize the marine vehicle in dry docks.

However, the operator's work inside the mobile housing is usually rendered difficult, if not impossible, because of the reduced space and congestion caused by the presence of the drive bearings and other elements such as a drive shaft propulsion electric engine. This difficulty is further increased at the shaft bearing end providing both radial support function and axial support function of the drive shaft.

BRIEF SUMMARY

In the light of the foregoing, the invention is intended to provide a shaft bearing or a component part of a shaft bearing addressing the aforementioned disadvantages.

In particular, the invention is intended to allow mounting or unmounting more easily of the shaft bearing active parts, including where a such a shaft bearing combines the radial guidance and axial guidance functions.

For this purpose, a ring for a marine vehicle drive unit shaft bearing is proposed, including an annular body, a cylindrical active part intended to ensure a sliding contact function with another ring of the shaft bearing.

According to a general feature of this ring, the cylindrical active part is segmented into multiple cylindrical surfaces, each cylindrical surface being attached in a removable manner to the annular body.

The use of a segmented cylindrical active part simplifies the mounting and dismounting by a technician, especially if the latter works in confined spaces such as inside the mobile housing.

Conveniently, the ring including a segmented active part is designed to be mobile against the housing of the drive unit. For example, the ring can be fastened to the drive shaft. In this case, the other ring is fixed against the housing. Such a provision is particularly convenient because it facilitates the dismounting of the active parts.

According to one embodiment, the annular body is segmented in several retractable annular modules, each annular module having a cylindrical surface part of the cylindrical active component.

The operator, using such a ring, can actuate the movement of one of the annular modules up to a position in which the cylindrical surface is accessible, to easily disassemble it.

We can also specify that each annular module is mobile compared to others moving on an axial direction of the ring.

According to one embodiment, each annular module includes a support and a radial buffer, the radial buffer includes the cylindrical surface and can be detached from the support.

There would also be a cylindrical frame comprising, for each annular module, two rods directed according to an axial direction of the annular, every ring module including two through holes, each rod being inserted in a through hole of the associated annular module so that it can slide inside of it.

According to one embodiment, all annular modules extend between two circular arcs underpinned by the same angle to the center.

The center angle interval is 20° to 40°, and more conveniently between 25° and 35°.

A design of the annular modules with a center angle ideally positioned in such intervals around 30° is convenient in that the cylindrical surfaces are small enough to be easily removable and aren't too many to unnecessarily increase the working time of the operator.

According to one embodiment, the ring has a frontal active part to ensure a sliding contact function with an axial stop of the shaft bearing, the front active part being segmented into several frontal surfaces, each frontal face being fixed in a removable manner to the annular body.

Such a ring ensures both radial and axial guidance functions, while generating a reduced footprint and with frontal and cylindrical active parts easy to dismantle.

The annular body is segmented in several retractable ring modules, each annular module having a frontal surface, the frontal surface being part of the frontal active part.

Conveniently, each annular module is mobile between a position wherein the respective annular module is axially located on one side of the frontal active part and a position in which the respective annular module is axially located across the frontal active part.

According to one embodiment, each annular module includes a support and an axial buffer, the axial buffer including the frontal surface, the axial buffer that can be detached from the support.

A second frontal active part can be also provided to ensure a sliding contact function with a second axial stop of the shaft bearing, the cylindrical active part being axially located between the frontal active parts.

According to another aspect, a shaft bearing is intended to be mounted on a shaft of a water vehicle drive unit, including one inner ring and one outer ring, at least one of the inner and outer rings is a ring as described previously.

Conveniently, the inner ring is a ring such as described previously according to the invention, the outer ring is a classic design ring. The interest of such a provision arises from the fact that the inner ring is most of the time the mobile ring and the outer ring is fixed.

According to one embodiment, the shaft bearing includes a first axial stop and a second axial stop, the first axial stop being mobile according to an axial direction of the bearing, the first axial stop comprising a first active frontal part providing a sliding contact function with the inner ring, the inner ring includes a second frontal active part providing a sliding contact function with the second axial stop.

According to another aspect, a use of a bearing as previously described for the dismounting of a surface forming an active part of the said bearing is proposed.

BRIEF DESCRIPTION OF THE DRAWINGS

Other purposes, of the invention will be revealed while reading the following description, given only as a non-limiting example, and related to the attached drawings attached on which.

DETAILED DESCRIPTION

Figure 1:
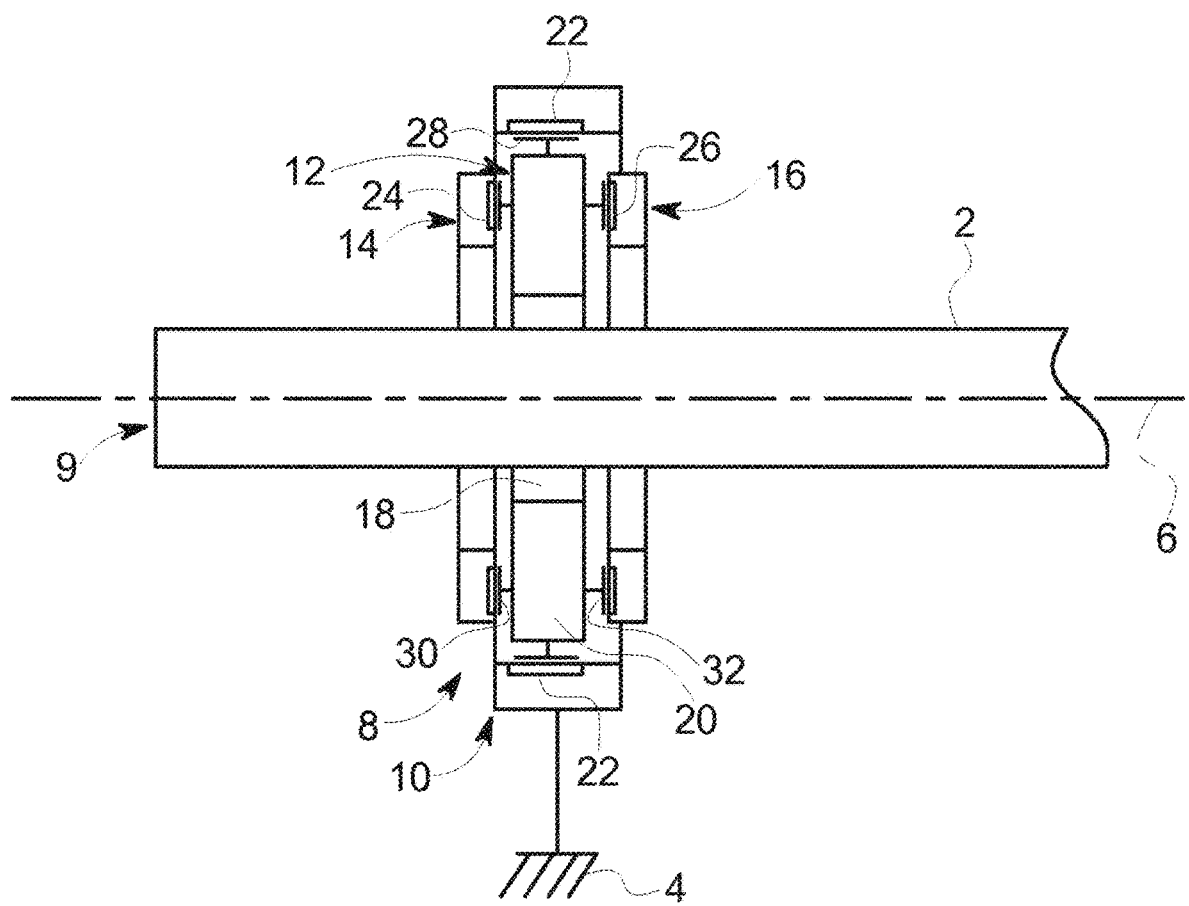
FIG. 1 schematically represents a shaft bearing according to a first embodiment.

With reference to FIG. 1, a propulsion shaft 2 supporting a propulsion element (not shown) of a drive unit is described. The drive unit has a mobile housing schematically represented in FIG. 1 by a framework 4. The drive unit is intended to be mounted on a marine vehicle (not shown) that can be a ship, a submarine or an oil rig. The drive element mounted on the drive shaft 2 may for example be a propeller or a pump rotor.

The propulsion shaft 2 extends according to an axial direction 6 and is mechanically connected to the mobile housing 4 by a pivot link around the axial direction 6. In the illustrated embodiment, the drive shaft 2 is rotated by an electric machine (not shown). The drive shaft 2 has one free end 9 and a driven end (not shown) across the free end 9. The driven end corresponds to the end of the shaft 2 on which the drive element is mounted. In other words, the free end 9 corresponds to the end of the shaft 2 opposite to the drive element against the electric machine. To allow for the achievement of the pivot link of the shaft 2 against the framework 4, the drive unit has a shaft bearing 8. The shaft bearing 8 ensures the relative guidance of the shaft 2 against the housing 4, according to the radial direction against the axis 6. The shaft bearing 8 is also a function of axial stop preventing the displacement of the shaft 2 against the housing 4, depending on the axis 6 direction.

A second shaft bearing (not shown) is mounted on the driven end of the propulsion shaft 2. Thus, two shaft bearings are mounted at one end of the shaft 2, respectively. Although in the embodiment example shown in FIG. 1, the shaft bearing 8, which ensures a double function of radial and axial guidance, is mounted on the free end 9, within the scope of the invention, the position of the two shaft bearings can be inverted.

The shaft bearing 8 includes an outer ring 10, an inner ring 12, a first axial stop 14 and a second axial stop 16. The outer ring 10 and the first axial stop 14 are recessed from the mobile housing 4. The inner ring 12 contains a cylindrical frame 18 and an annular body 20 mounted on the frame 18. The cylindrical frame 18 is mounted fastened to the propulsion shaft 2. For example, the cylindrical frame 18 can be fretted on the shaft 2. The annular body 20 is mechanically connected to the cylindrical frame 18 by a slide type mechanical link guided by the axial direction 6. In other words, the annular body 20 is able to move forward according to the axis 6 direction, from the frame 18.

The outer ring 10 includes a cylindrical sliding surface 22, radially located inside the outer ring 10. The sliding surface 22 extends over the entire inner circumference of the ring 10.

The axial stop 14 contains a frontal sliding surface 24 and extending in a plane substantially perpendicular to the direction of the axis 6. The sliding surface 24 spans the entire circumference of the axial stop 14, to have an annular shape extending around the axis 6.

The axial stop 16 has a frontal sliding surface 26 ranging significantly in a plane parallel to one of the sliding surface 24, i.e., in a plane substantially perpendicular to the direction of the axis 6. The surface 26 spans the entire circumference of the axial stop 16, to have an annular shape extending around the axis 6.

The cylindrical sliding surface 22, and the frontal sliding surfaces 24 and 26 are made of materials designed to promote their friction with another surface of the inner ring 12.

Figure 5:
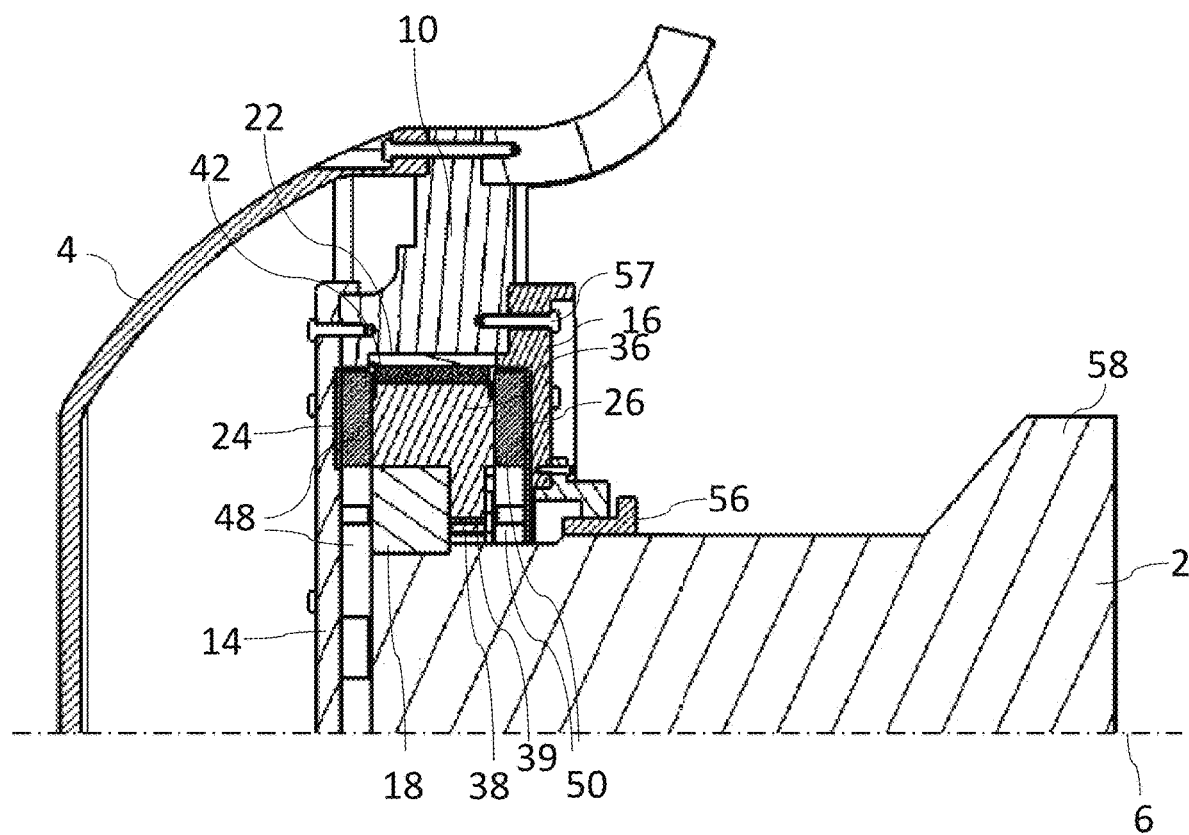
FIG. 5 is a cut view of 'A-A' of the bearing ring in FIG. 4 with all annular modules arranged in an operating position.

The axial stop 16 is able to move forward compared to the mobile housing 4 according to the direction of the axis 6. Specifically, the axial stop 16 is able to move axially between a functioning position, as illustrated in FIG. 1, and an assembly/disassembly position as shown in FIG. 6B, axially shifted to the outside of the bearing ring 8, i.e., shifted to the right of FIG. 1. Between the assembly/disassembly position (as shown in FIG. 6B) and the operating position (as shown in FIG. 5), the axial stop 16 is conveniently offset with a distance between the thickness of the inner ring 12 and three times the thickness.

Figure 2:
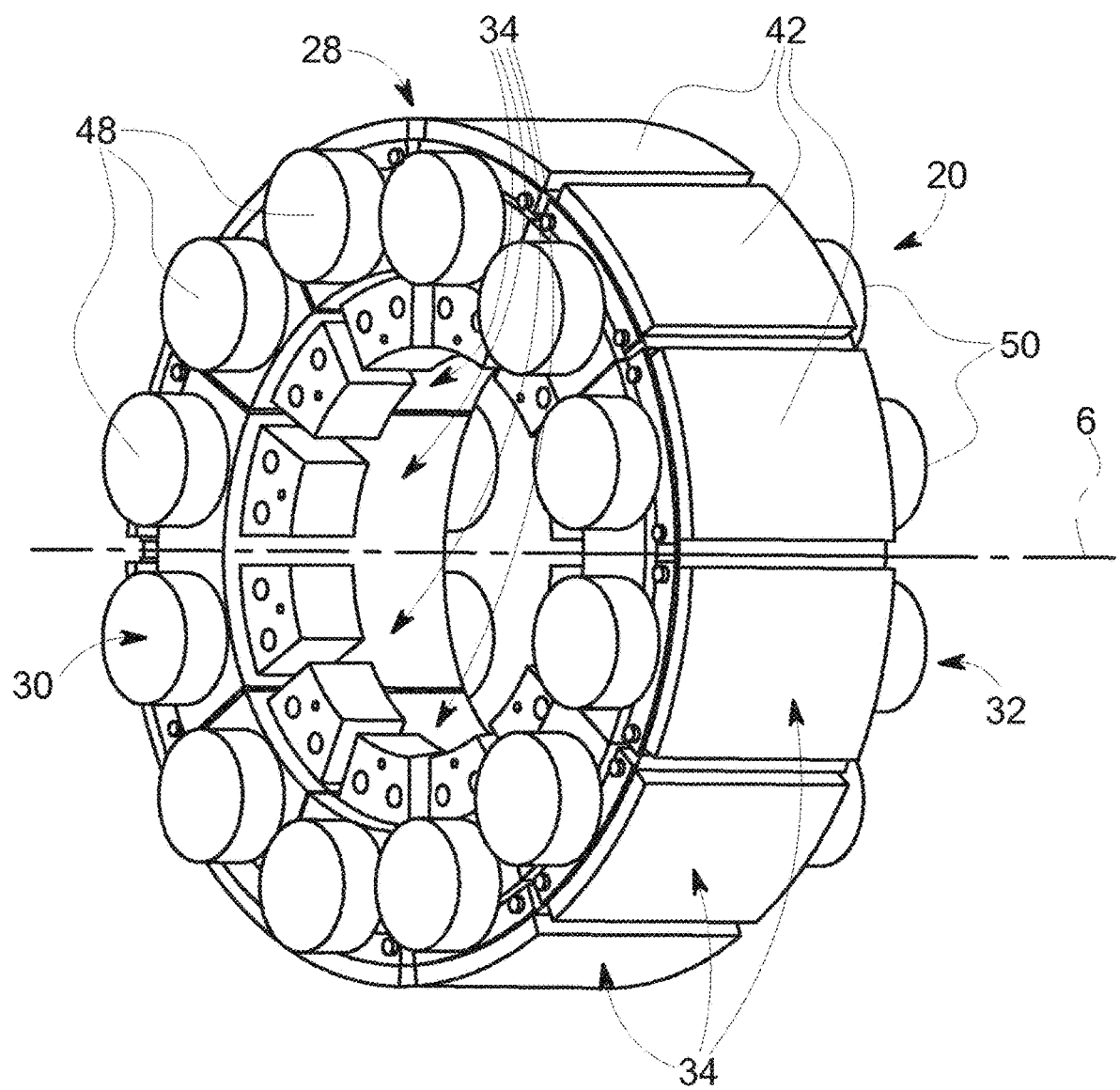
FIG. 2 is a perspective view of a bearing ring of FIG. 1.
Figure 4:
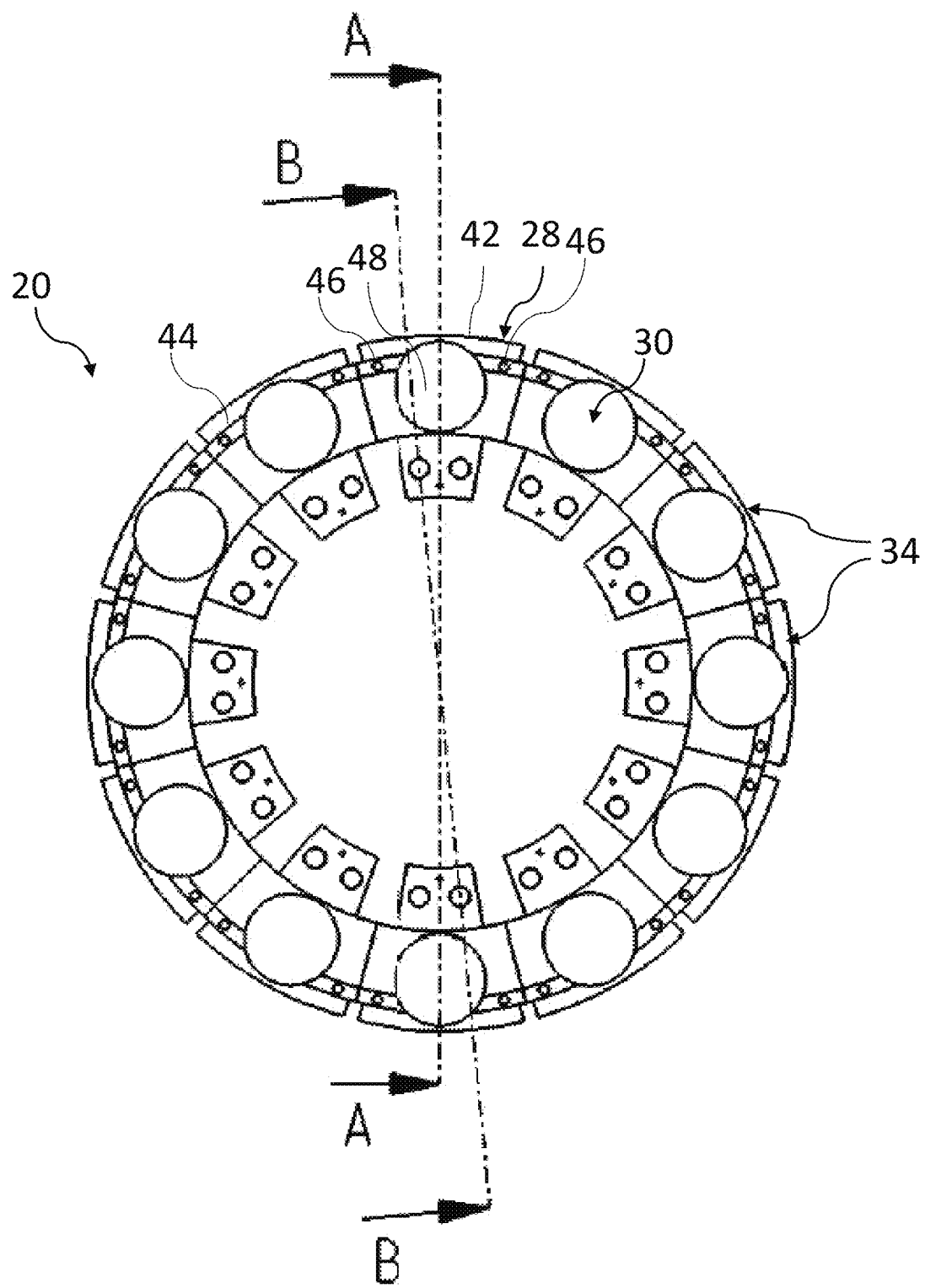
FIG. 4 is another perspective view of the bearing ring of FIG. 1.

We will now describe the structure of the annular body 20 of the inner ring 12, with reference to FIGS. 1, 2 and 4. FIGS. 2 and 4 are schematic views of the inner ring 12. For more clarity, only the cylindrical body 20 of the inner ring 12 is represented in FIGS. 2 and 4, the cylindrical frame 18 having been voluntarily omitted.

The cylindrical body 20 consists of an active cylindrical part 28 extending around the axial direction 6. As shown in FIG. 1, the active cylindrical part 28 provides a sliding contact, oriented according to the radial direction against the direction of the axis 6, with the sliding surface 22. The cylindrical body 20 consists of a first frontal active part 30 forming a substantially perpendicular plane to the axial direction 6. As shown in FIG. 1, the first frontal active part 30 provides a sliding contact, oriented according to the axial direction of the axis 6, with the frontal sliding surface 24. Similarly, the cylindrical body 20 has a second frontal active part 32, forming a plane substantially perpendicular to the axial direction 6. The second frontal active part 32 is axially opposed to the first frontal active part 30, compared to the bearing ring 12. As shown in FIG. 1, the second frontal active part 32 provides a sliding contact, oriented according to the axial direction of the axis 6, with the frontal sliding surface 26.

Conveniently, a hydraulic fluid is supplied to be inserted between the active cylindrical part 28 and the frontal active parts 30, 32 and their respective sliding surfaces 22, 24, 26, respectively. The hydraulic fluid may consist of a thin layer of oil to allow for a transfer of efforts between the rings by generating a limited friction.

Figure 3:
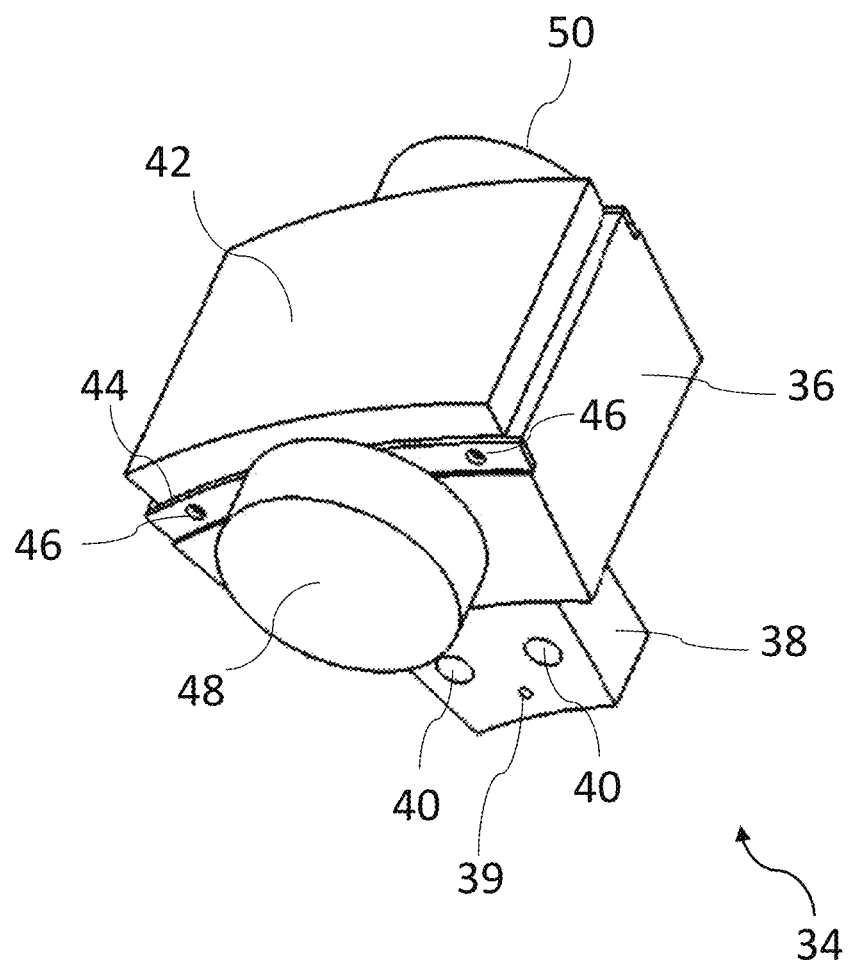
FIG. 3 is a perspective view of a ring annular module of FIG. 2.

In reference to FIGS. 2 and 3, the cylindrical body 20 is divided into twelve annular modules 34 substantially identical. In the illustrated embodiment example, all annular modules 34 extend between two circle arcs underpinned by the same center angle (not referenced) being substantially equal to 30°. However, considering a different number of annular modules, or a different center angle is within the invention framework. We can still specify that some of the annular modules extend between two circle arcs underpinned by a first value of center angle, the other annular modules extending between two circle arcs underpinned by a second center angle value, separate from the first.

Referring to FIG. 3, each annular module 34 includes a support 36 delimited lengthwise by two parallel planes that are perpendicular to the axial direction 6, and orthoradially by two secant planes and forming between them an angle roughly equal to 30°. The support 36 extends radially inward by a protruding part 38. The protruding part 38 includes a threaded hole 39 and two side-by-side through holes 40. The threaded hole 39 is centered beneath the side-by-side through holes 40 and the through holes 40 are substantially directed according to the axial direction 6. For extraction of an annular module 34, the threaded hole 39 can be fitted with a pressure screw (not shown) to ease starting of the extraction of the annular module 34 by means of a sliding operation along guiding tool rods 52 (as depicted in FIG. 6B).

Each annular module 34 has a radial buffer 42 extending radially outward of the support 36. The radial buffer 42 is made of a material limiting friction with the sliding surface 22. The radial buffer 42 is attached to a mounting tab 44. The mounting tab 44 can be connected to the support 36 with two screws 46.

The annular module 34 includes also a first axial buffer 48. The first axial buffer 48 can be attached to a tab similar to tab 44, such tab can be connected to the support 36 by means similar to the screws 46. Similar to the radial buffer 42, the first axial buffer 48 is made of a material limiting friction with the sliding surface 24.

The annular module 34 includes a second axial buffer 50. The first axial buffer 48 and the second axial buffer 50 extend along the support 36 according to the axial direction 6, each respectively in an opposite direction. Similar to the first axial buffer 48, the second axial buffer 50 can be attached to a tab to allow its fixation in a removable manner on the support 36. The second axial buffer 50 is made of a material limiting friction with the sliding surface 26.

As shown in FIGS. 2 and 4, when the twelve annular modules 34 are placed side by side, the twelve radial buffers 42 form a substantially cylindrical surface referred to herein as the cylindrical active part 28. Similarly, the twelve first axial buffers 48 realize a substantially flat and annular surface constituting the frontal active part 30. Similarly, the twelve second axial buffers 50 realize a substantially flat and annular surface constituting the frontal active part 32. FIG. 4 further includes sections 'A-A' and 'B-B' to explain the operation of the components of the bearing ring 2 with reference to FIGS. 5, 6A and 6B below.

FIG. 5 is a cut view of 'A-A' of the bearing ring in FIG. 4 with all annular modules arranged in an operating position. As shown in FIG. 5, the axial stop 16 is mounted on a mobile sleeve 56. The sleeve 56 is arranged around the shaft 2 and is able to move forward according to the axial direction 6 against the shaft 2. In this way, the axial stop 16 can be moved between the operating position which it's in support and connected with the outer ring 10, and an assembly/disassembly position (discussed below with reference to FIG. 6B), in which it is shifted axially outward from the shaft bearing 8. In order to limit the axial shift of sleeve 56 compared to the shaft 2, the said shaft 2 has a stop radial protrusion 58.

When the second axial stop 16 is arranged according to the operating position, the active cylindrical part 28 is in contact with the sliding surface 22, the frontal active parts 30, 32 being in contact with the sliding surfaces 24, 26, respectively. The shaft bearing 8 being rotatable provides the radial and axial guidance functions of the inner ring 12 compared to the outer ring 10, against the axis 6. Fixation means 57, e.g., screws, allow for the connection of the outer ring 10 with the second axial stop 16.

Figure 6A:
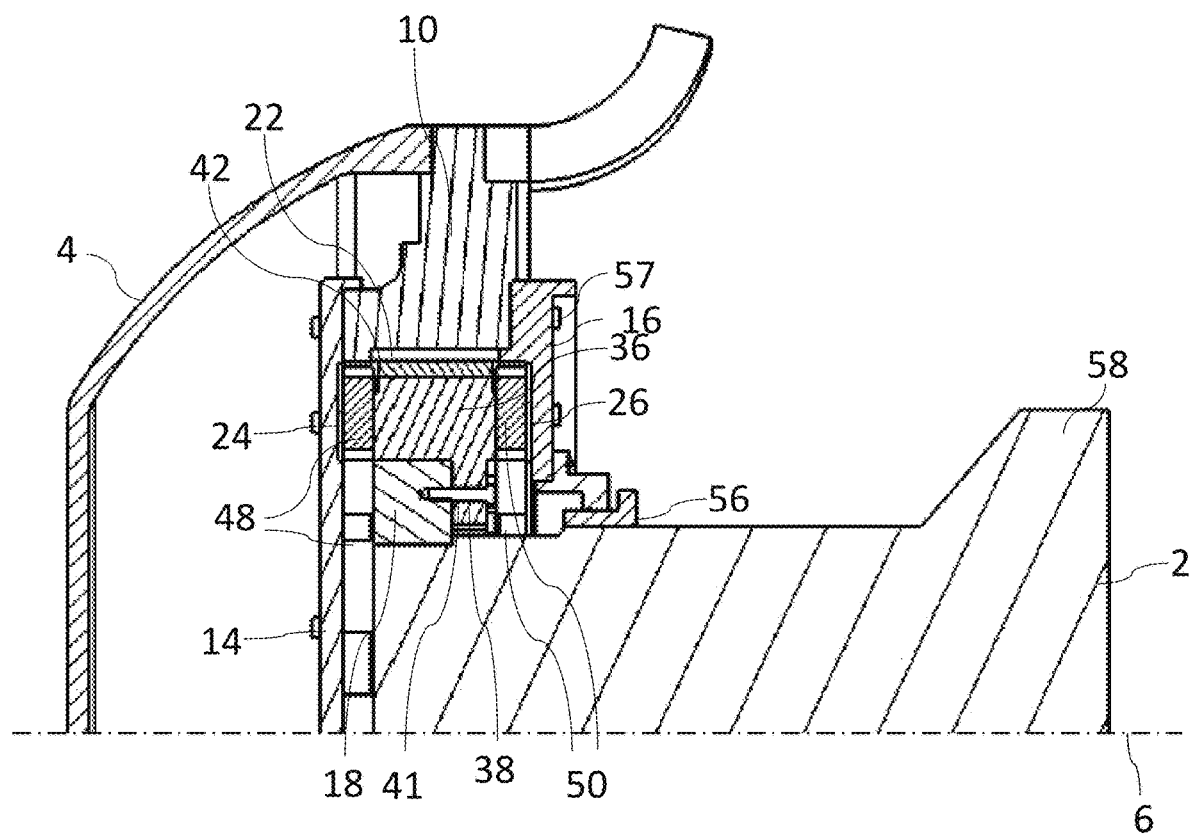
FIGS. 6A and 6B are cut views of 'B-B' of the bearing ring in FIG. 4 including with an annular module arranged in an assembly position before disassembly and during disassembly, respectively.
Figure 6B:
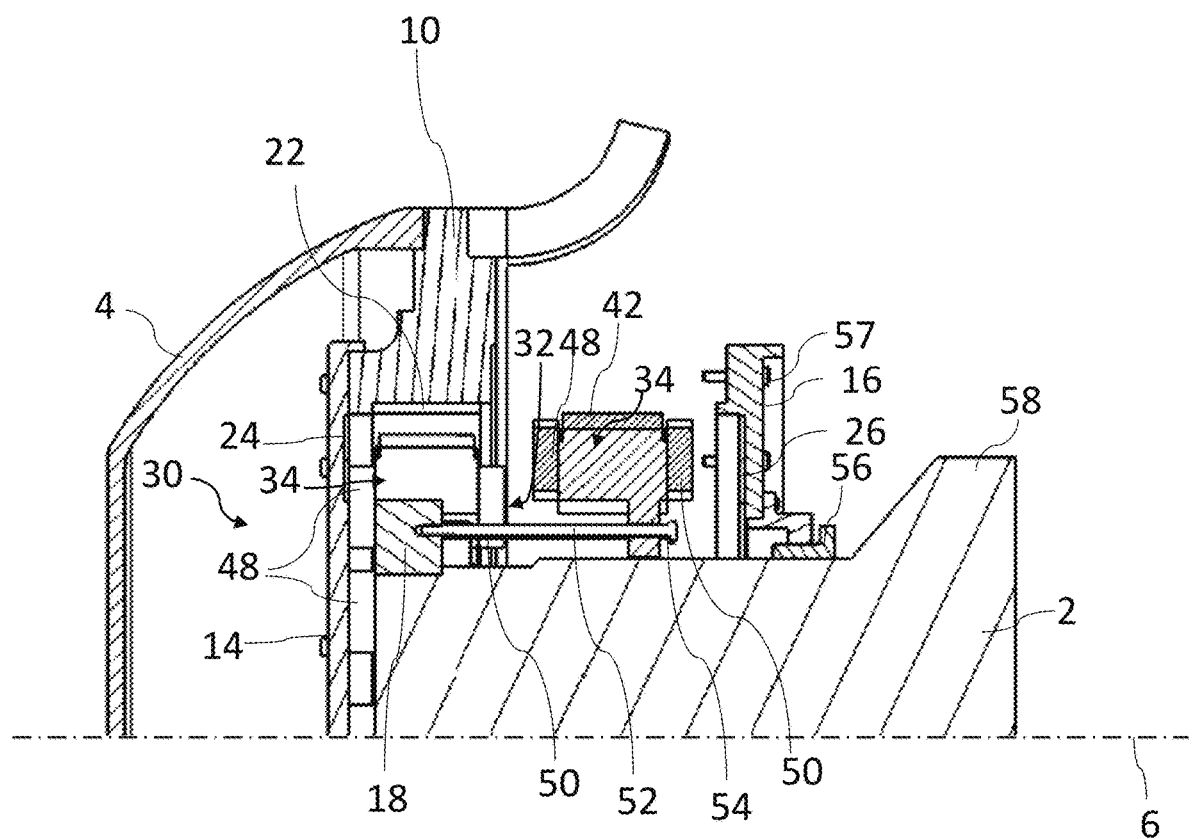

FIGS. 6A and 6B are cut views of 'B-B' of the bearing ring in FIG. 4 including with an annular module arranged in the assembly position before disassembly and during disassembly, respectively.

As shown in FIG. 6A, the two through holes 40 of the protruding part 38 of each annular module 34 are each for the passage of bolts 41 for affixing each annular module 34 to the cylindrical frame 18. Frame 18 includes 24 bolts 41 to secure the frame 18 to the 12 annular modules 34 that extend in the same direction parallel to the axis 6. This results in the possibility, for each annular module 34, to move forward compared to the frame 18 according to the axial direction 6. In other words, each of the annular modules 34 can move forward according to the axial direction 6, compared to the other annular modules 34.

As mentioned above since the axial stop 16 is mounted on a mobile sleeve 56 and the mobile sleeve 56 is arranged around the shaft 2 the axial stop 16 can be moved between the operating position (as shown FIGS. 5 and 6A), in which it's in support and connected with the outer ring 10, and an assembly/disassembly position (as depicted in FIG. 6B), in which it is shifted axially outward from the shaft bearing 8. In order to limit the axial shift of sleeve 56 compared to the shaft 2, the said shaft 2 has a stop radial protrusion 58.

When, as shown in FIG. 6B, the sleeve 56 is shifted axially outwards from the shaft bearing 8, the axial stop 16 is arranged according to its assembly/disassembly position. The bolts 41 are replaced by guiding tool rods 52 to be used only to perform the disassembly and assembly of the annular modules 34. During disassembly operation of the annular module 34, one bolt 41 is removed and one guiding tool rod 52 is threaded in the frame 18. Then, the second bolt 41 is removed and replaced by a second guiding tool rod 52. Then, optionally a pressure screw (not shown) can be threaded in the threaded hole 39 (as depicted in FIGS. 3 and 5) to help hand-sliding of the annular module 34. Then, the annular module 34 is sliding by operator's hands, on the two guiding tool rods 52. When out of the shaft bearing 8, the module active parts, radial and axial buffers 42, 48 and 50 can be inspected and changed if needed. Then the annular module 34 can be pushed back by hand via the operator in position. One guiding tool rod 52 is then removed and replaced by bolt 41, then the second guiding tool rod 52 is removed and replaced by a bolt 41. Both bolts 41 are then secured with right torque tightening. According to an embodiment, it is then possible to shift each of the annular modules 34 axially outward from the outer ring 10 according to an assembly/disassembly position of the annular module 34. In particular, it is possible to shift each of the 12 annular modules 34, so that the first axial buffer 48 of the annular module 34 is located outside the space axially between the frontal active parts 30 and 32. In order to limit the axial shift of an annular module 34 from the frame 18, the guiding tool rods 52 each have a stop item 54.

The above mentioned operations, make it possible for an operator to easily access the buffer(s) 42, 48 or 50 of the annular module 34 which has been shifted and disassemble the buffer(s) 42, 48 or 50. To do this, the operator disengages the fastening means 57 then drives the axial displacement of the mobile sleeve 56 from its operating position to its assembly/disassembly position. The operator can then remove the buffers 50 constituting the active part 32 and replace them. Then, the operator drives one of the annular modules 34 in an axial direction from its operating position to the assembly/disassembly position. The operator then dismantles and replaces the buffer 42 and buffer 48 of the moved annular module 34. The operator then resets the moved annular module 34 in its operating position. He rotates the shaft 2 by a 30° angle, and then implements the same actions on the annular module 34 which took the place of the annular module 34 for which the buffers 42, 48 or 50 are to be replaced. When the operator has replaced the buffers 42, 48 or 50 of all the annular modules 34 and reset them in their operating position, he shifts the axial stop 16 from its assembly/disassembly position until its operating position, replaces the guiding tool rods 52 with the bolts 41, then he engages again the fastening means 57. This manipulation is easier when the buffers 42, 48 and 50 have reduced dimensions thanks to the segmentation of the annular body 20. Thus, the operator is not obstructed to manipulate them inside the mobile housing 4.

In addition, by operating small rotations of the shaft 2 against the housing 4, the operator can make sure to always place the annular module 34 on which he works in one place, for example in a place located vertically above the axis 6. The operator then only needs to access a small space within the mobile housing 4 to easily disassemble the active parts of the shaft bearing 8.

In the illustrated embodiment example, the annular body 20 into twelve annular modules 34. However, the present invention is not limited hereto, and a different number of annular modules 34. In particular, by choosing a higher number of annular modules 34, the size of the radial and axial buffers 42, 48 and 50 to handle is reduced for the replacement of the active parts, so as to facilitate the operator's work for a single annular module 34. However, the increase in the number of annular modules 34 multiplies the assembly or disassembly actions of radial or axial buffers 42, 48 and 50, so as to lengthen the time necessary for the operator to replace all the buffers 42, 48 and 50 of the annular modules 34. The number of twelve (12) modules 34 is a good compromise, allowing easy handling of the buffers 42, 48 and 50, while avoiding an unnecessarily increase of the duration of the active parts replacement operations.

In this embodiment example, the inner ring 12 has a cylindrical active part 28 and two front active parts 30 and 32. However, the scope of the invention is not exceeded by considering a rotating bearing, in which the active parts are laid out differently.

According to a first (not shown) alternative to this first embodiment example, the front active part 32, formed by the buffers 48, is no longer part of the inner ring 10, but is fixed on the axial stop 16. However, the annular body 20 includes the sliding surface 26. According to a second variant (not shown), the active part 30 is attached to the axial stop 14, cylindrical body 20 including the sliding surface 24. Each of these variants is technically feasible and allows the bearing 8 to perform its function, facilitating the replacement of at least some of the active parts by an operator. The first variant, however, is more interesting than the second, because it allows, as the first example of realization, to axially shift the three buffers 42, 48 and 50 outside of the space axially positioned between the active parts 30 and 32.

In the first example of realization and its first and second variants, the active cylindrical part 28 is part of the inner ring 12, the outer ring 10 having the sliding surface 22. As a result, it is easier for the operator to access the buffer 42 constituting the active part 28.

According to a third variant (not shown), the cylindrical active part is mounted on the outer ring, the inner ring including the corresponding sliding surface. Although such variant makes the dismantling by the operator of the buffers forming the cylindrical active part 28 more complicated, this variant simplifies the overall design of the shaft bearing compared to the first example of realization. It may result in a reduced cost of bearing design and manufacture, as well as a smaller footprint.

Moreover, the invention has been described in reference to a shaft bearing 8 combining the radial and axial guidance functions of the shaft 2 compared to the frame 4. However, it is possible to specify a bearing according to the invention and providing the only radial guide function. In other words, the invention can be also implemented with the shaft bearing set on the driving end of the shaft 2. In this case, this bearing is different from the bearing 8 in that it lacks the axial stops 14 and 16 and active parts 30 and 32. Furthermore, it is of course possible to envisage without exceeding the scope of the invention a ring including a segmented cylindrical active part, and one or two front active parts not segmented.

Figure 7:
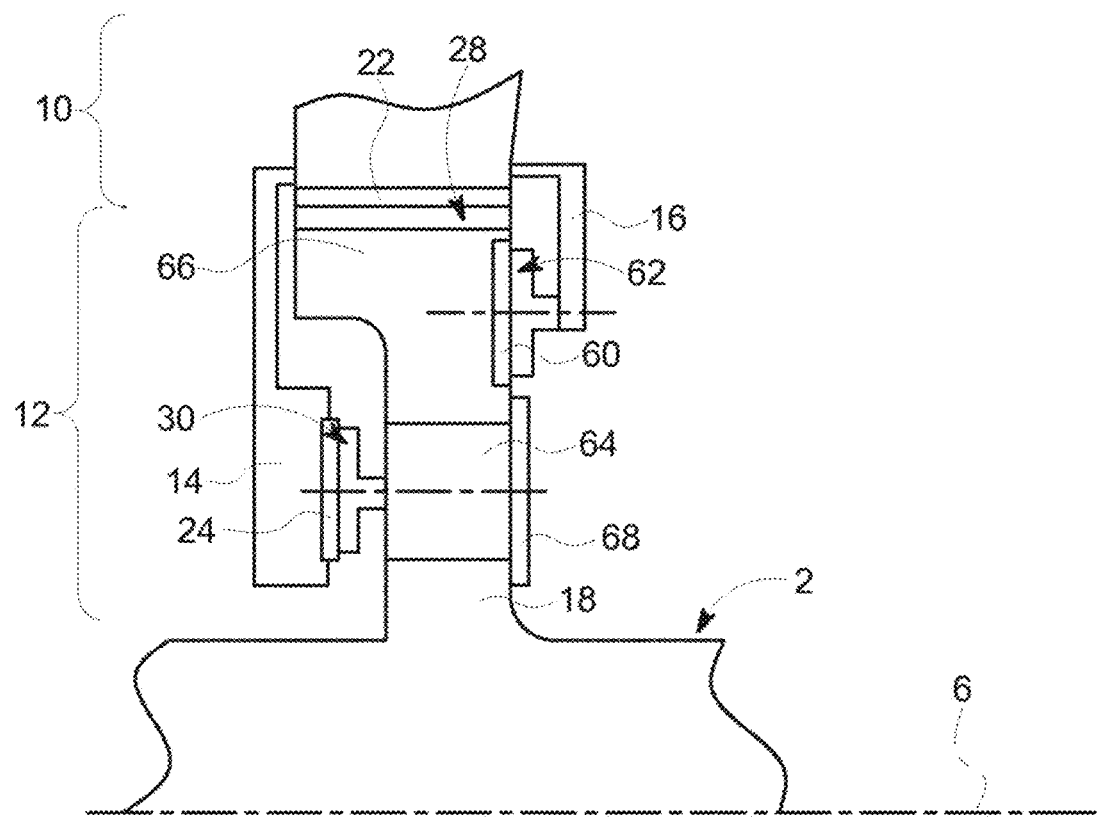
FIG. 7 is a cross-axial view of a shaft bearing ring according to a second example of the invention embodiment.

Referring now to FIG. 7, a second example of the invention embodiment is represented. Identical items carry the same references.

As in the first example, the inner ring 12 includes a frame 18 and an annular body 20 segmented in several annular modules (not referenced). The second example of embodiment differs especially from the first example, in that each annular module is also segmented according to the radial direction from the axis 6, in an internal portion 64 and an external portion 66. The external portion 66 extends radially projecting outward from the inner portion 64. The portion 64 may be moved forward, relatively compared to the portion 66, according to the direction of the axis 6. When the annular modules are in operating conditions, a locking mechanism 68 prevents the relative movement of the internal portion 64 of each module from the external portion 66. For example, the locking mechanism 68 may include a snap ring.

In addition, according to the second example, the inner ring 12 includes a frontal sliding surface 60, noticeably flat and perpendicular to the axis 6, and an axial sliding contact with a frontal active part 62 mounted on the axial stop 16. Thus, the distribution of the active parts between the rings 10, 12 and stops 14, 16 is the first alternative of the first example of realization. As noted, this provision allows the bearing to properly ensure its double function of radial and axial guidance, while optimizing the space to facilitate the replacement operations of the bearing active parts.

By means of a bearing according to the second example of embodiment, an operator can implement the following procedure for the disassembly of the active part 30.

As a first step, the operator removes the locking mechanism 68. Then, the operator moves the internal portion 64 in displacement, relatively against the external portion 66, according to the axis direction 6, until the active part 30 is axially shifted outside the space axially delimited by stops 14 and 16. As a result, it is easier for an operator to remove the buffers 48 forming the active part 30.

Once the buffers 48 are dismantled and replaced, the operator moves the internal portion 64 to its original position and replaces the locking mechanism 68.

In view of the two examples which have been detailed in reference to the figures, the invention allows an operator to replace the active parts of a marine vehicle drive unit bearing ring more easily. It results, in particular, in the possibility to maintain the shaft bearings without having to disassemble the drive unit and therefore without having to put the ship in dry docks.

The invention is even more interesting when the shaft bearing, for which the active parts are to be replaced provides a dual function of guidance according to the radial and axial directions.

Indeed, it appears already that a bearing including especially both a cylindrical active part and two frontal active parts in which the cylindrical active part is arranged axially between the frontal active parts presents a much smaller footprint than a conventionally used bearing, which includes a first rotary bearing ensuring the radial guidance and an axial stop bearing providing axial guidance.

In addition, with a bearing consistent with the invention, the operator can remove and replace the buffers forming the front and cylindrical active parts by working in the same place. The result is the possibility of increasing the volume of this space, so as to further facilitate the replacement of the active parts of the bearing from the inside of the mobile housing of the drive unit.

What is claimed is:

1. A ring for a shaft bearing of a marine vehicle drive unit, the ring comprising:
    an annular body segmented into a plurality of retractable annular modules wherein each retractable annular module is mechanically connected to a cylindrical frame by two bolts guided in an axial direction and comprising:
    an active cylindrical part segmented into a plurality of cylindrical surface segments and designed to provide a sliding contact function in a radial direction with a cylindrical sliding surface radially extending over an inner circumference of a second ring of the shaft bearing, and provide a sliding contact function in an axial direction,
    wherein each retractable annular module is separately removable in the axial direction compared to other retractable annular modules of the plurality of retractable annular modules, and wherein each retractable annular module comprises one of the cylindrical surface segments of the active cylindrical part wherein each cylindrical surface segment is removably fixed to the annular body.

2. The ring according to claim 1, wherein each retractable annular module comprises:
    a support and a radial buffer, the radial buffer including the cylindrical surface segment, the radial buffer being detachable from the support.

3. The ring according to claim 1, wherein each retractable annular module is an arc segment and each retractable annular module has a same angular extension.

4. The ring according to claim 3, wherein the same angular extension is between about 20° and about 40°.

5. The ring according to claim 1, wherein the ring further comprises a frontal active part intended to provide a sliding contact function with an axial stop of the shaft bearing, the frontal active part being segmented into a plurality of frontal surfaces, each frontal surface being removably fixed to the annular body.

6. The ring according to claim 5, wherein each retractable annular module comprises one of the plurality of frontal surfaces forming a part of the frontal active part.

7. The ring according to claim 5, in which each retractable annular module includes a support and an axial buffer, the axial buffer including the frontal surface and being detachable from the support.

8. The ring according to claim 5, the ring further comprising a second frontal active part to ensure a function of the sliding contact with a second axial stop of the shaft bearing, the active cylindrical part being axially located between the frontal active parts.

9. A shaft bearing designed to be mounted on a shaft of a propulsion unit of a water vehicle drive unit, comprising an inner ring and an outer ring, at least one of the inner and outer rings being a ring according to claim 1.

10. The shaft bearing according to claim 9, further comprising a first axial stop and a second axial stop, the first axial stop being movable in translation in an axial direction of the shaft bearing, the first axial stop comprising a first frontal active part providing a sliding contact function with the inner ring, the inner ring including a second frontal active part providing a sliding contact function with the second axial stop.

11. A method of dismantling an active cylindrical part of a shaft bearing designed to be mounted on a shaft of a propulsion unit of a water vehicle drive unit, comprising an inner ring and an outer ring, at least one of the inner and outer rings having an annular body mechanically connected to a cylindrical frame and segmented into a plurality of retractable annular modules, each retractable annular module including two through holes for a passage of two bolts to affix each retractable annular module to the cylindrical frame, the method comprising:
    replacing the two bolts with two rods directed in the axial direction of the ring, wherein each rod being inserted in a through hole of the two through holes of a respective retractable annular module; and
    sliding the retractable annular module of the inner ring, along the two rods into a disassembly position, for the disassembly of the active cylindrical part of the shaft bearing, wherein each retractable annular module being removable in the axial direction compared to other retractable annular modules of the plurality of retractable annular modules, and wherein each retractable annular module comprises a cylindrical surface segment of the active cylindrical part wherein each cylindrical surface segment is removably fixed to the retractable annular module.

\* \* \* \* \*